May 3, 1966 J. S. COFFARO ETAL 3,249,204
METHOD FOR WEIGHING STRANDED PRODUCTS
Original Filed April 6, 1962 10 Sheets-Sheet 3

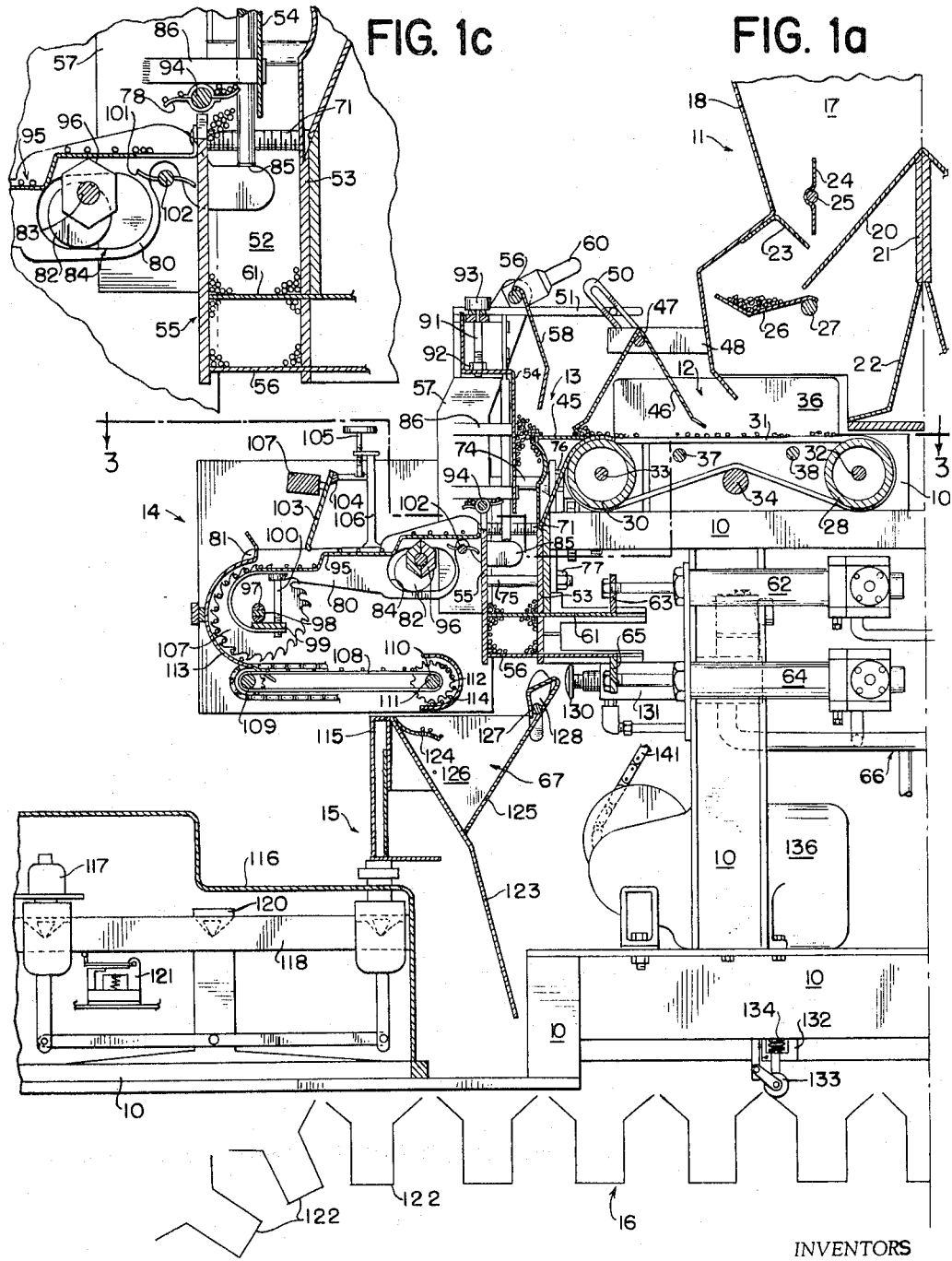

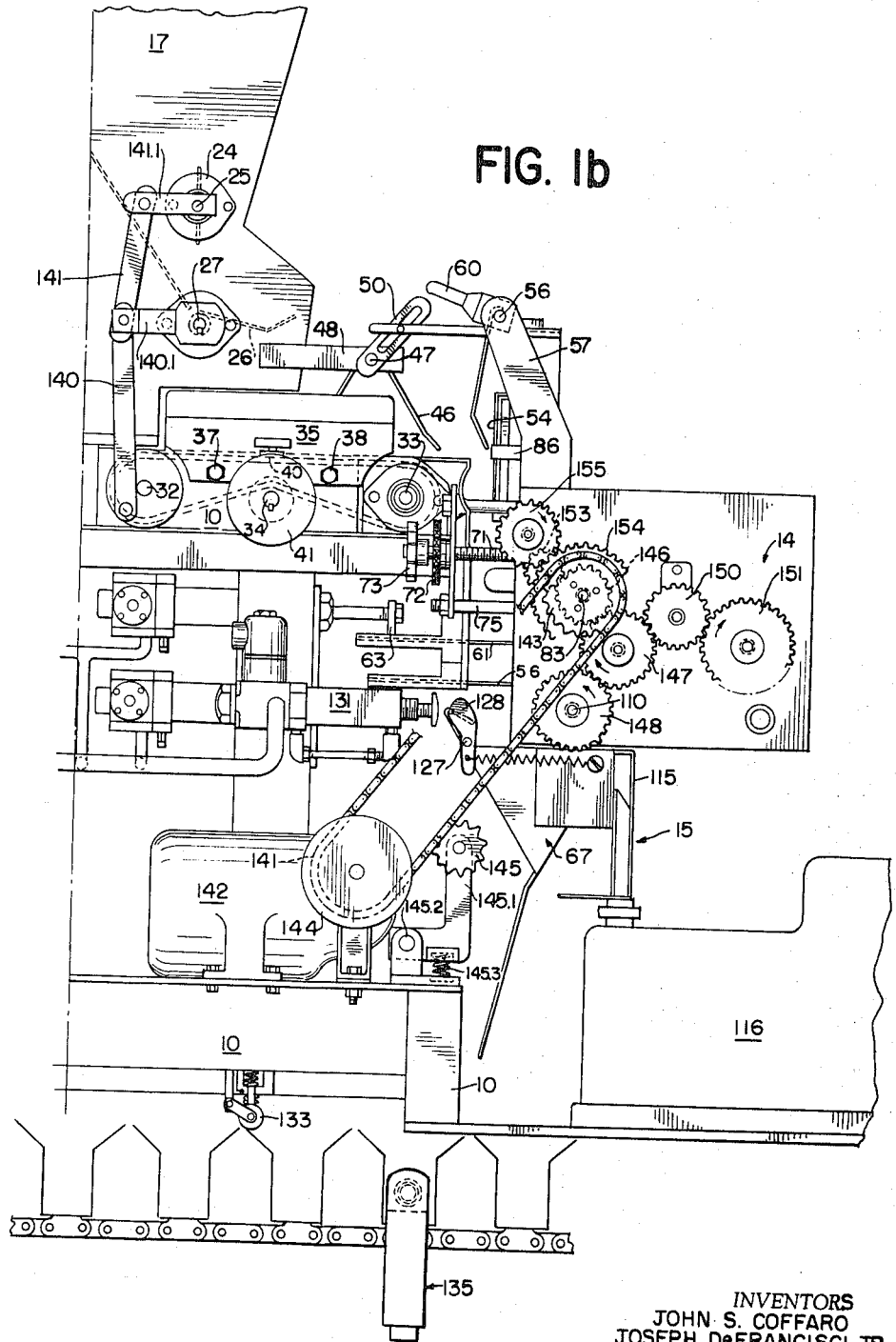

INVENTORS
JOHN S. COFFARO
JOSEPH DeFRANCISCI, JR.
BY
ATTORNEYS

May 3, 1966  J. S. COFFARO ETAL  3,249,204
METHOD FOR WEIGHING STRANDED PRODUCTS
Original Filed April 6, 1962  10 Sheets-Sheet 4

INVENTORS
JOHN S. COFFARO
JOSEPH DeFRANCISCI, JR.
BY
ATTORNEYS

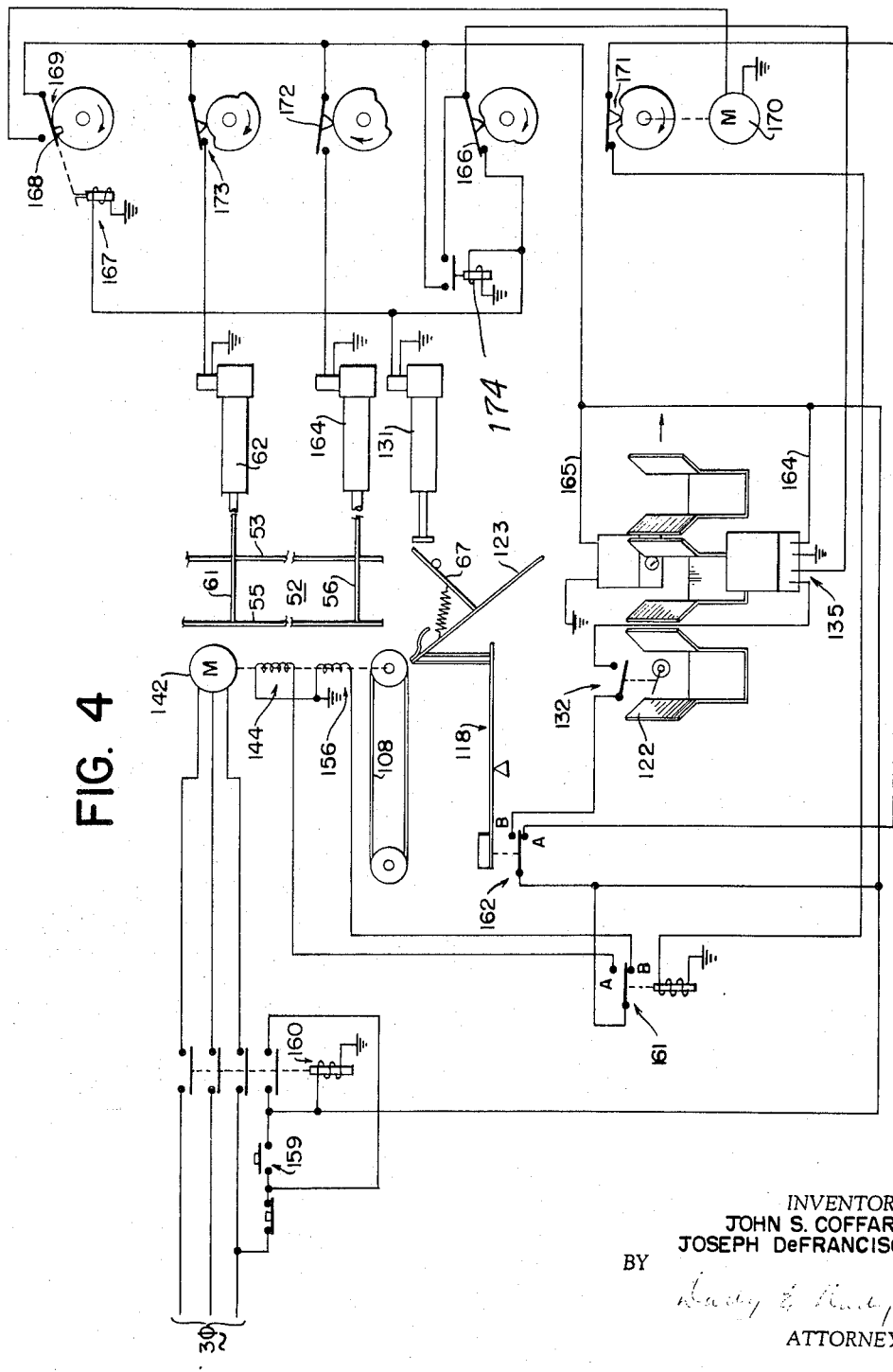

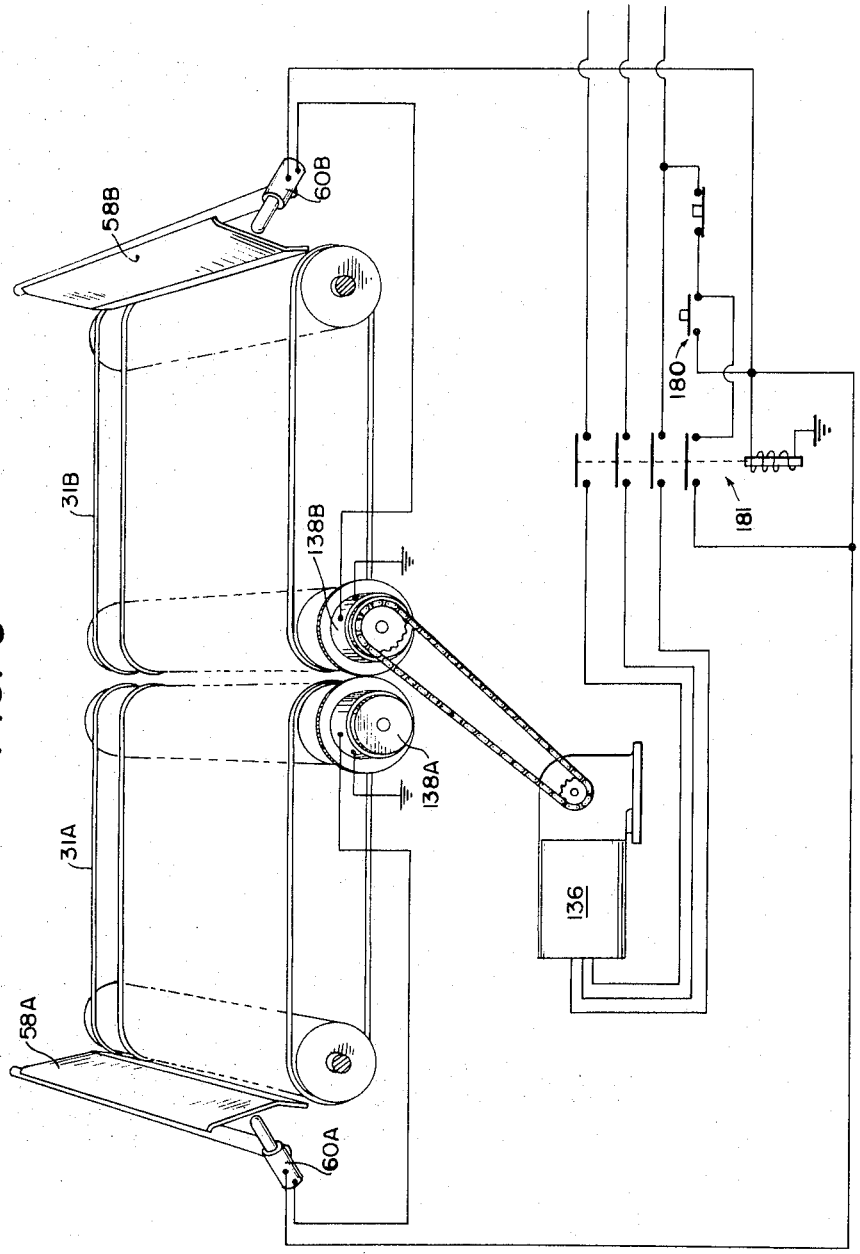

May 3, 1966     J. S. COFFARO ETAL     3,249,204
METHOD FOR WEIGHING STRANDED PRODUCTS
Original Filed April 6, 1962     10 Sheets-Sheet 7

INVENTORS
JOHN S. COFFARO
JOSEPH DeFRANCISCI, JR.
BY

ATTORNEYS

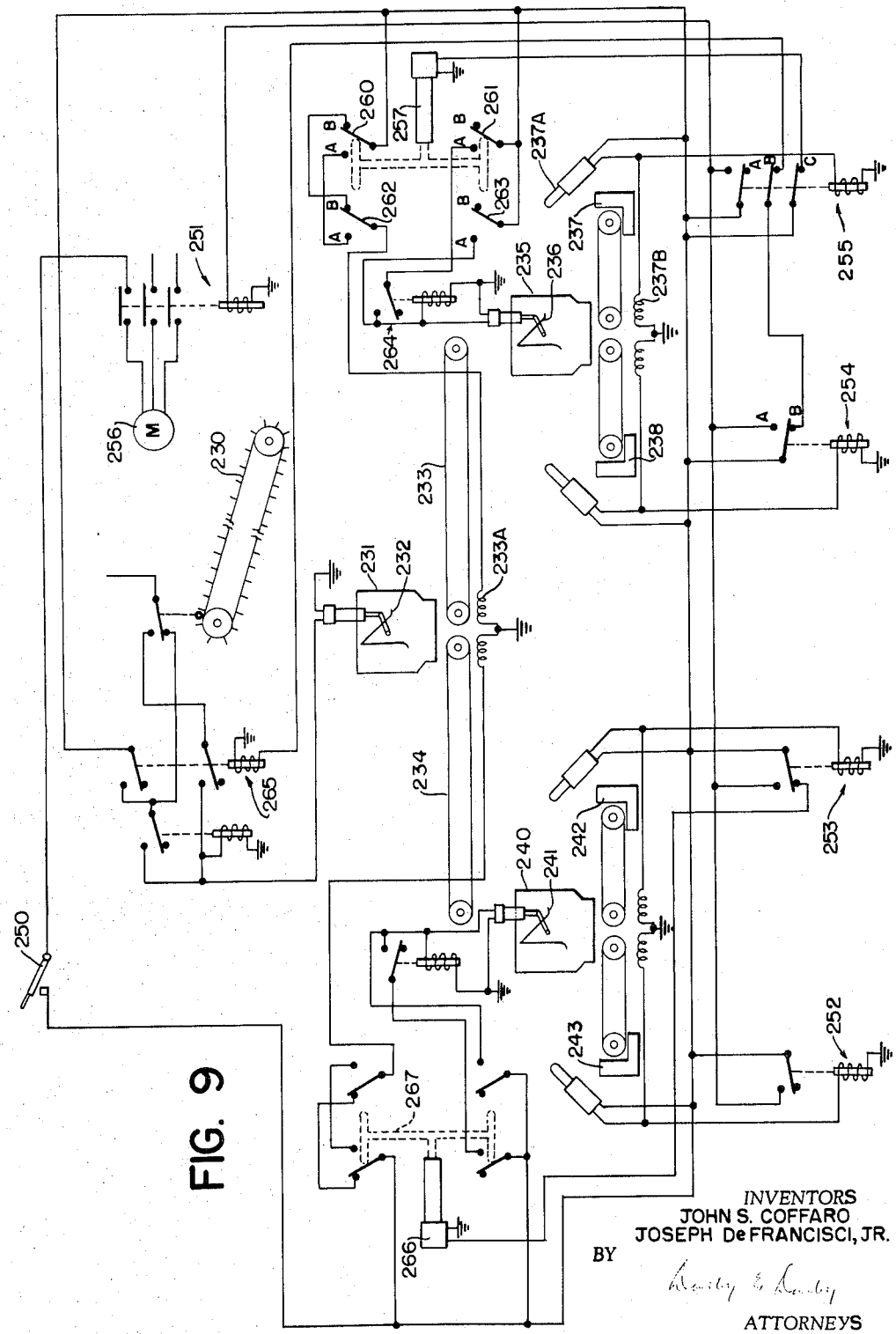

2

United States Patent Office 3,249,204
Patented May 3, 1966

3,249,204
METHOD FOR WEIGHING STRANDED PRODUCTS
John S. Coffaro, North Bellmore, and Joseph De Francisci, Jr., Rockville Centre, N.Y., assignors to De Francisci Machine Corporation, Brooklyn, N.Y., a corporation of New York
Original application Apr. 6, 1962, Ser. No. 185,703, now Patent No. 3,134,449, dated May 26, 1964. Divided and this application Apr. 7, 1964, Ser. No. 358,682
16 Claims. (Cl. 198—39)

This application is a division of our co-pending application Serial No. 185,703, filed April 6, 1962, and now Patent No. 3,134,449, issued May 26, 1964.

This invention relates to an apparatus for handling stranded products, such as dry macaroni, spaghetti and the like; and the invention has reference more particularly to a mechanism for automatically receiving such stranded products, dividing the product into equal predetermined weight increments and discharging these increments in a convenient form to a container for subsequent packaging operations.

Weighing stranded products such as macaroni on a commercial, continuous run basis, if done by hand, is a time-consuming and expensive operation. In addition, hand weighing is only as accurate as the person performing the weighing operation. Food processors, in order to insure compliance with Federal food content weight labeling statutes, generally resolve these weighing inaccuracies in the weighing step in favor of the consumer by packaging amounts slightly in excess of the labeled weight. Over a period of time the expense of these slightly inaccurate weights mounts substantially. This expense coupled with the labor costs at mounting labor rates renders highly useful a machine which can automatically and accurately perform the weighing operation.

The machine disclosed in this application accomplishes this function. It reliably, accurately and expeditiously weighs macaroni to predetermined weights and discharge the weighed bunches in convenient form for subsequent packaging. Although this disclosure discusses primarily use of the machine for macaroni and spaghetti products, the machine can also be used for other small diameter, cylindrically-shaped products such as drinking straws, welding rods and the like.

The principle of weighing employed is essentially a two-step operation. The first step is a pre-weigh step where a weight slightly under the desired weight is segregated by a volumetric measurement. This preweight is then dropped into a weigh bucket. The next step is to feed a final increment of strands into the weigh bucket in a strand by strand flow until the accurate weight is achieved, at which time the weigh bucket dumps into a compartment suitable for carrying the measured amount of strands to a packaging station.

The machine embodied in the present disclosure can be conveniently divided into six main elements, all of which are interconnected and co-operate to perform the weighing operation. The first element is the feed hopper assembly which receives the strands fed either by hand or mechanical conveyor. From the feed hopper assembly the strands fall by gravity to the next element which is the main feed conveyor section. The principal element of the feed conveyor section is an O ring conveyor which carries the strands to the bulk feed measuring station and the dribble feed mechanism. The bulk feed measuring station performs the volumetric measuring operation described above to segregate the pre-weight. The dribble feed mechanism supplies the strand by strand incremental feed to the weigh bucket also described above. The next main element is the weigh bucket assembly which is mounted on a conventional balance scale. The weigh bucket receives feed from the bulk feed measuring station and the dribble feed mechanism until the final strand necessary for the desired predetermined weight falls into the bucket, at which time it dumps into a container of the next main element which is the package conveyor system. The package conveyor system positions empty containers for receiving the strands from the weigh bucket and conveys the filled containers to a suitable packaging station.

A primary object of the invention is to provide a reliable automatic machine for quick and accurate weighing of stranded products and segregating predetermined weights of the products into bunches convenient for packaging.

A further object of this invention is to perform the weighing and segregating of stranded products in such a manner as to prevent bridging and bunching of the stranded products across each other to avoid jamming of weighing machines and breakage of the products.

A still further object of this invention is to provide a more accurate automatic weighing method for stranded products by employing a pre-weigh step followed by an incremental strand by strand weigh step.

A still further object of this invention is to provide means for achieving strand by strand feed to a weigh scale for accurate weight determination.

A still further object of this invention is the provision of a means for positioning empty containers for receiving the stranded products from the weigh scale so as to prevent any loss by spillage.

A still further object of this invention is to provide a machine employing two weighing scales operating simultaneously in parallel from a single feed and discharging into containers of an associated package conveyor system.

A still further object of this invention is to provide strand feed means to smoothly supply strands to a machine employing two scales in such a way as to utilize the maximum weighing capacity of both scales.

It is a still further object of this invention to provide means for adjusting the capacity of the pre-weigh step to permit using the same machine for a range of final weights and also to permit minor adjustment of the pre-weigh capacity while the machine is in operation to achieve optimum final weighing capacity.

Other objects of this invention not at this time more particularly enumerated will be apparent from the accompanying description and drawings wherein:

FIGURES 1a and 1b taken together, illustrate a side view of a dual weighing station machine, FIGURE 1a being a vertical section of the left hand weighing station taken substantially as indicated by the line 1—1 of FIGURE 2, FIGURE 1b being an elevation of the right hand weighing station;

FIGURE 1c is an enlarged view of part of FIGURE 1a;

FIGURE 4 is a schematic diagram of certain electrical control circuits of the dribble feed and weigh bucket section;

FIGURE 5 is a schematic diagram of certain electrical control circuits of the feed hopper and main feed conveyor sections;

FIGURE 9 is a schematic diagram of certain electrical control circuits for the pyramid arrangement shown in FIG. 8.

Figure 2:
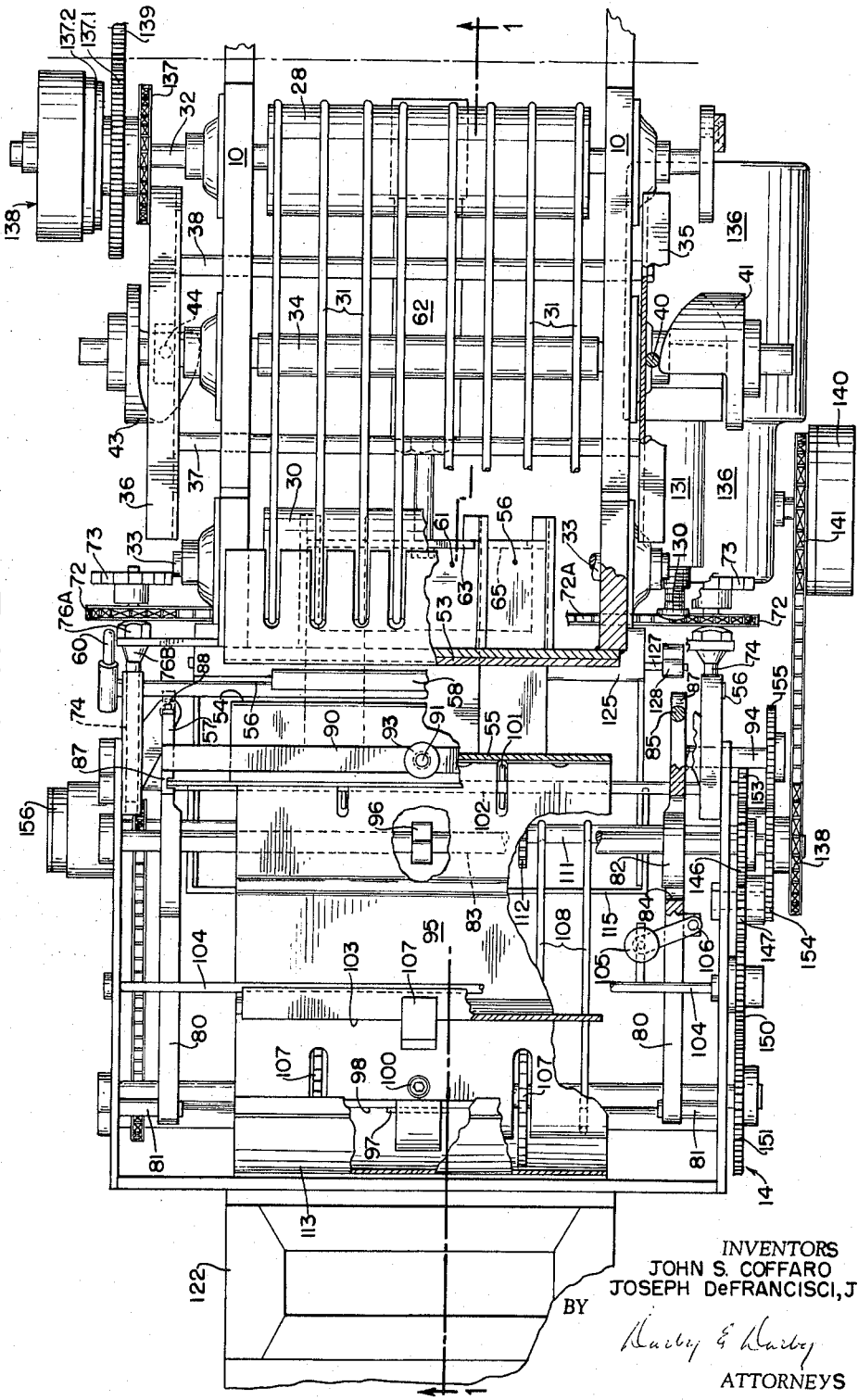
FIGURE 2 is a plan view of the left hand weighing station shown in FIGURE 1a, drawn in partial section to illustrate internal parts.

Referring to FIGURE 1a the illustrative machine has a main frame 10 by which the feed hopper assembly 11, main feed conveyor 12, bulk feed measuring station 13, dribble feed mechanism 14, and weigh bucket assembly 15 are supported. The package conveyor system 16 is not supported by framework 10 but is positioned relative to it so as to co-operate with the above listed components of the machine.

*Feed hopper assembly*

Referring to FIGURES 1 a, b and c and 2, strands are fed so as to lie horizontally in the feed hopper assembly 11, which distributes the feed to two parallel weighing stations in the particular machine illustrated (one station shown in FIGURE 1a and adjoining station shown in FIGURE 1b). The weighing stations are essentially identical although certain individual components are positioned in the obverse orientation to each other. The purpose of the feed hopper assembly 11 is to maintain an adequate storage of feed for an uninterrupted flow to the weighing stations and to assist in aligning the strands for a more uniform and steady flow of feed. The manner in which these purposes are accomplished will now be described.

Supported from the framework 10 are two feed hopper side plates 17, one on either side of the machine. Bolted to side plates 17 on each end of the machine is outside end cover 18 both of which combine to complete the enclosure of the feed hopper assembly 11 for a dual weighing station machine.

Strands of macaroni are gravity fed to the feed hopper 11 either by hand or conveyor, one form of conveyor being illustrated in FIGURE 6, to be described hereinafter.

On entering the feed hopper 11 strands are distributed to the two weighing stations by divider plate 20 which in turn is bolted to the feed hopper side plates 17.

Extending downwardly from divider plate 20 and separating the feed between the associated weighing stations is a bracing rib 21 and the attached inside feed hopper cover plate 22, both of which are bolted to side plates 17.

Henceforth in this description, unless otherwise specified, discussion will be limited to only one of the two associated weighing stations, since both stations employ the same basic structure and operate in the same manner.

Opposite the lower end of divider plate 20 and welded to outside end cover 18 is a feed hopper restriction plate 23 forming an orifice through which the feed must pass. This orifice serves to steady the feed rate by restricting the flow and maintaining a level of feed in the hopper 11.

Restriction of the feed by plate 23 may tend to block the flow. To correct this an oscillating stir plate 24 welded to shaft 25 which is suitably journalled through bearings mounted in each of the side plates 17 is oscillated by means hereinafter described. Oscillation in this manner keeps the strands flowing freely and evenly through the orifice between plate 23 and the lower end of plate 20.

Strands fall until they land on slide plate 26 welded to shaft 27 which is also suitably journalled through bearings mounted in each of side plates 17 and oscillated by means hereinafter described. Oscillation of slide plate 26 causes the strands to fall to the left through the orifice formed between plate 26 and the outside end cover 18. When slide plate 26 is level strands will not flow.

The purpose of oscillating the strands on plate 26 before passing through the orifice formed with plate 18 is to align the strands normal to the line of travel of the feed stream to prevent bridging, thereby contributing to the uniform flow of the feed.

*Bulk feed conveyor section*

Strands fall from slide plate 26 in the above described manner, thereby passing from the feed hopper assembly 11 to the next main section of the machine which is the bulk feed conveyor section 12. This section comprises drive pulley 28, idler pulley 30, and rubber O ring conveyor 31. Drive pulley 28 is mounted on drive shaft 32, the ends of which are suitably journalled through bearings at each side of framework 10 and driven by means hereinafter described. In like manner the shaft 33 supporting the idler pulley 30 is also journalled through bearings at each side of framework 10 to permit free rotation. Rolling freely and driven by travelling conveyor (31) is roller pulley 34, also journalled through bearings in framework 10.

When the machine is feeding strands to the weight station, drive pulley 28, in that half of the machine illustrated in FIGURE 1, turns in a counterclockwise direction, causing the upper run of conveyor 31 to move to the left. Strands fall from the feed hopper 11 onto, and against the path of, conveyor 31 and are carried to the left for the next step of the weighing cycle.

As strands fall onto conveyor 31 the ends of many of the strands protrude beyond the desired feed flow width, which for convenience of handling is the length of the longest strand fed to the hopper 11. Ends protrude irregularly because the distance between the hopper side plates 17 is greater than the longest strand length to facilitate ease of feeding, and strands fed to the hopper 11 fall anywhere between these plates 17. Means are provided for laterally straightening these protruding ends during the strand feed flow on the conveyor 31, which will now be described.

Adjacent each side of the upper run of conveyor 31 are tap plates 35 and 36 (FIGURE 2) fixedly spaced apart by connecting bars 37 and 38 which are movably mounted to permit side to side motion through bearings in frame 10. (Corresponding parts on right hand scale are identified in FIGURE 1b by the same numbers.) Attached to the base of each tap plate, referring for illustration to plate 35 of FIGURE 2, is a cam follower 40 which engages cam 41 mounted on cam shaft 42 which is keyed to and driven by pulley roller 34. Surface of cam 41 is shaped so that for each half revolution of cam shaft 42 cam follower 40 is displaced so as to push tap plate 35 toward conveyor 31 the distance required to properly position the protruding ends adjacent plate 35. Similarly cam 43 and cam follower 44 position the protruding ends adjacent tap plate 36 for each of the opposite half revolutions of cam shaft 42. This alternating side to side pushing action of tap plates 35 and 36 centers the strands on conveyor 31 during the feed's transit through the bulk feed conveyor section 12.

In the manner described strands are carried by conveyor 31 onto the conveyor discharge plate 45 which is bolted to frame 10. The strands continue to move to the left across plate 45 being pushed by the following strands from conveyor 31.

Additional straightening means are provided by leveler plate 46 mounted on shaft 47 journalled at each end through support brackets 48 which are welded to the feed hopper outside end cover 18. Leveler plate 46 is oscillated about shaft 47 by means of slotted rocker 50 in which rides the pin of the crank 51. Crank 51 oscillates vertically by means of an actuating force hereinafter described to impart an oscillatory rocker motion to the leveler plate 46.

Oscillation of the leveler plate 46 straightens and serves to prevent bunching and bridging of these stands during their travel on conveyor 31 and discharge plate 45, which in turn improves the flow characteristics of the feed to the next main section of the machine which is the bulk feed measuring station 13.

Bulk feed measuring station

As discussed earlier the principle of weighing herein employed consists of providing a volumetric bulk pre-weight first and then adding to it by a slow strand by strand flow the necessary incremental weight to achieve the final desired weight. The bulk feed measuring station 13 performs this pre-weight function.

Bulk feed measuring station 13 includes a supply and volumetric measuring chamber 52 defined by the vertical and arcuate sections of the feed discharge plate 45, inner chamber plate 53, feed retarding plate 54, outer chamber plate 55, and lower bulk feed plate 56. The sides of the chamber 52 are open.

Feed enters the chamber 52 off the conveyor discharge plate 45 and piles on top of the lower bulk feed plate 56 until the level of feed under normal running conditions rises until it is almost even with the horizontal section of the feed discharge plate 45. The feed hopper 11 and bulk feed conveyor 12 capacities are designed to insure adequate feed to the chamber 52 to maintain this level during normal operation.

The following described means are provided to shut off the feed if the level in chamber 52 rises too high. Mounted on shaft 56 which is pivoted and free to rotate in bearings mounted in the dribble feed framework 57 is the downwardly extending feed stop plate 58. Also attached to shaft 56 and diametrically opposite the feed stop plate 58 is counterbalanced mercury switch 60. When the strands discharging from the feed discharge plate 45 begin to overflow and bunch up on top the chamber 52, continued food of the strands swings the feed stop plate 53 in a clockwise direction which opens mercury switch 60 which in turn interrupts current flow to the actuating means for the main feed conveyor section 12 and feed hopper section 11 thereby halting the feed flow. Switch 60 remains open until the level in chamber 52 falls, permitting feed stop plate 58 to swing back counter-clockwise under the influence of the counterweight of switch 60, and therefore the current flow to the above sections is not re-established. While the current is interrupted in this manner strands in the feed hopper 11 will not flow because of both the orifice formed between the feed hopper restriction plate 23 and the lower end of the divider plate 22 and the operation of the slide plate 26 described earlier.

The volumetric pre-weigh step is accomplished in the bulk feed measuring station 13 by means of upper bulk feed plate 61 and lower bulk feed plate 56. Both plates are retractable through inner chamber plate 53 by means of conventional air cylinders mounted on framework 10, air cylinder 62 operating upper bulk feed plate 61 through link 63, and air cylinder 64 operating lower bulk feed plate 56 through link 65. Air is supplied through air inlet manifold 66.

Figure 3A:
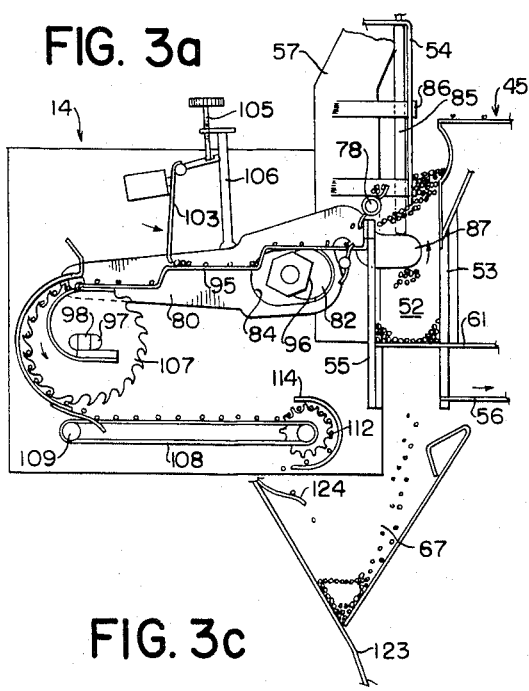
FIGURES 3a, 3b, 3c and 3d are schematic views showing progressive positions of various elements of the machine.
Figure 3B:
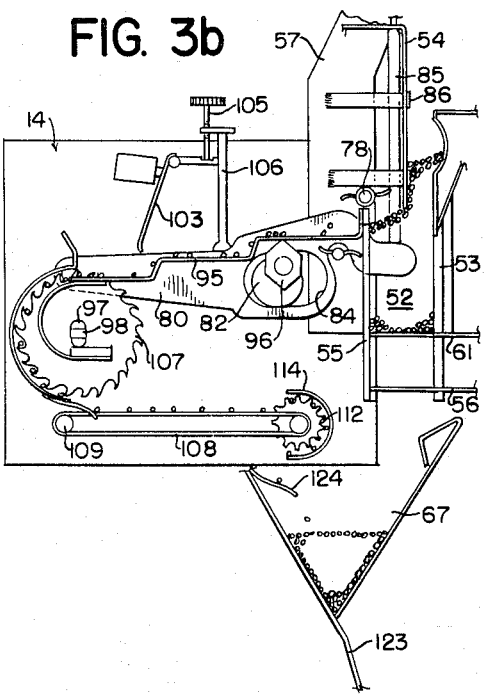
Figure 3C:
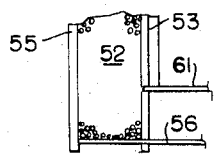
Figure 3D:
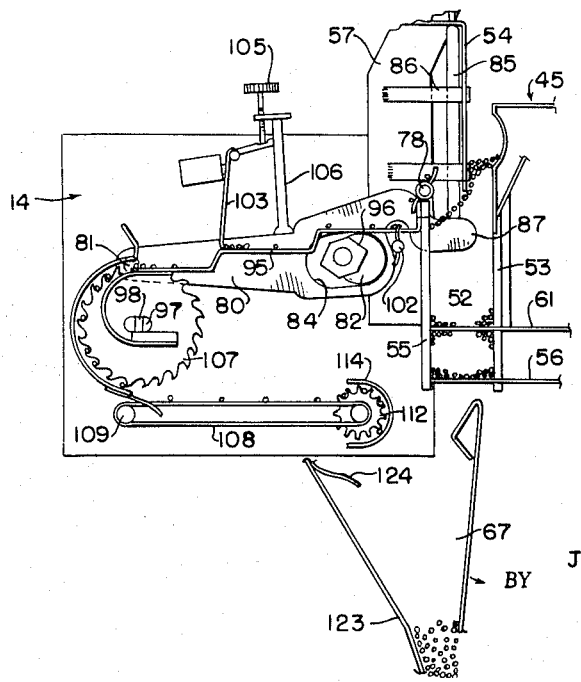

Referring to FIGURE 3, in the normal sequence of operation upper plate 61 is first retracted, allowing feed to fill the bottom of chamber 52 on top of extended lower plate 56 (FIG. 3c). Then upper plate 61 is extended until it comes to rest against the outer chamber plate 55 thereby defining volumetrically a pre-weight by separating the main feed from the feed compartmented between upper plate 61 and lower plate 56 (FIG. 3d). The lower plate 56 is then retracted permitting the pre-weight of strands to fall into weigh bucket 67 (FIG. 3a). The lower plate 56 is then extended against the outer chamber plate 55 (FIG. 3b), and the upper plate 61 is retracted (FIG. 3c) to permit a repetitive pre-weigh cycle. Controls for synchronizing these progressive steps will be discussed hereafter with reference to the electrical system employed in the machine.

Referring to FIGURES 1b and 2, travel of upper bulk feed plate 61 in extending and retracting is guided on each side by mating slots in guide blocks 68 bolted to framework 10. In like manner travel of lower bulk feed plate 56 is guided by bulk feed guide blocks 70 similarly mounted.

Adjusting screws 71 adjacent each side of the bulk feed measuring chamber 52 are provided to permit variation of the amount of pre-weight to accommodate a range of desired final weights and also to adjust the pre-weigh for optimum weighing capacity. The unthreaded portion of each screw 71 is journalled through and laterally fixed by collars to the framework 10. The threaded portion of each screw 71 threads into outer chamber plate 55 so as to cause lateral displacement when rotated. Both screws 71 are connected together by sprockets 72 and a chain 72A, so that on making an adjustment by manually turning hand wheel 73 mounted on screw 71, both move together in an equal amount and thereby avoid canting of the outer chamber plate 55.

With respect to changing the amount of pre-weight by laterally displacing outer chamber plate 55, it should be noted that the stroke on cylinders 62 and 64 is longer than the largest possible displacement. Cylinders 62 and 64 are small diameter cylinders, capable of exerting only a small force, against outer chamber plate 55 and they will always bottom against plate 55 regardless of the position which that plate assumes.

Thus in the manner just described the desired pre-weight, which must always be slightly less than the desired final weight, is measured in the bulk feed measuring station 13. The next stop, which is the metering of the strand by strand incremental addition to this pre-weight, is accomplished by the dribble feed mechanism 14.

Dribble feed mechanism

Referring to FIGURES 1a, b and c and 2, the dribble feed frame 57 is supported on the main frame 10 so as to permit lateral displacement of the entire dribble feed mechanism. Upper support guides 74, one at each side of a chamber 52 and lower support guides 75 also one at each side of chamber 52 comprise this laterally movable support means. Guides 74 and 75 support frame 57 by riding through holes bored in frame 57 and by being rigidly held to the main frame 10 by nuts 76A and opposing collars 76B, and 77A and 77B respectively. Supporting the dribble feed section 14 by guides 74 and 75 permits easy adjustment of the volumetric pre-weight by shifting the entire dribble feed section including the outer chamber plate 55 to the desired position as described above.

In describing the means by which the dribble feed section 14 picks off strands from the main feed for strand by strand deposit in the weigh bucket 67, it should be noted, as described earlier, the level of feed in chamber 52 normally rises to about the level of the horizontal section of feed conveyor discharge plate 45. The principal elements which deliver part of the main feed to the dribble feed section 14 are oscillating retarding plate 54 and the revolving blades of pick-up rotor 78. Retarding plate 54 oscillates vertically to meter feed to pick up rotor 78 which revolves counterclockwise to pick off a small number of strands and deliver them to the dribble feed mechanism 14 (see FIGURE 3). When the retarding plate 54 is in its downward position (see FIGURE 3B and 3D) flow of strands to rotor 78 is blocked, and when plate 54 is in the upward position (see FIGURE 3A) strands flow under plate 54 and into the path of the blades of the pick up rotor 78.

Oscillatory movement is imparted to the retarding plate 54 by means of two rocker arms 80, one adjacent each side of the dribble feed mechanism 14, each of which is pivoted about pin 81 mounted on the dribble feed frame 57 and actuated by revolving circular cam 82 mounted eccentrically on cam shaft 83 which is suitably journalled through bearings in the dribble feed frame 57 and driven by means hereinafter described. Cam 82 bears against cam surface 84 of rocker 80 causing it to swing up and down. Resting on the outer end of each rocker arm 80 is support bar 85 which is aligned by passing through bored support brackets 86 in the dribble feed frame 57. Plate 54 is mounted on the support bars 85 in a manner hereinafter described so as to bear down on the rocker arms 80 by gravity so that rotation of cam 82 causes plate 54 to vertically oscillate. Support bars 85 may alternatively be positively connected to rocker arms 80 by means of suitable linkages.

Oscillation of the retarding plate 54 permits some of the strands to flow into the path of the rotating pick up blades 78 but restricts them to a point to provide the flow required for accuracy of the final weight. Accuracy of this weight is determined by the amount of material in suspension between the discharge of the dribble feed mechanism 14 and receipt by the weigh bucket 67. This means a heavy dribble flow will be less accurate than a light dribble flow; however, heavy dribble flows increase the speed of the machine. The speed of the machine is also increased by minimizing the dribble flow by maximizing the amount of pre-weight. Therefore it can be seen that a balance of speed must be determined by the user and an adjustment of the dribble flow is provided in the retarding plate mounting means to permit achievement of this desired balance.

This adjustment is made by moving retarding plate 54 up or down in relation to support bars 85 and is accomplished by the novel plate mounting means employed. Retarding plate 54 is positioned at its upper end by having its side edges slotted in retarding plate side frames 87 which in turn are bolted (88) to support bars 85. Extending between side frames 87 is the retarding plate cross brace 90 through which passes adjusting screw 91 that threads into and through adjusting nut 92 and the horizontal section of retarding plate 54 on which nut 92 is mounted. Screw 91 is rotatable but vertically fixed by being recessed in cross brace 90.

Fixed to the upper end of retarding plate adjusting screw 91 is adjusting knob 93 which on being manually rotated raises or lowers the retarding plate 54 relative to support bars 85 thereby varying the feed to the dribble feed section 14 as described above.

The pick up rotor blades 78 are mounted on shaft 94 which is journalled through bearings in the dribble feed frame 57 and driven in a manner to be described later. The blades 78 pick up strands released by retarding plate 54 and deposit them on the flexure plate 95 which is mounted as a cantilever on outer chamber plate 55. The cantilever mounting gives springlike properties to flexure plate 95 suitable for setting up vibrations. Vibration of flexure plate 95 causes the strands to rise and fall on the plate and level off in line one after another. Vibration also agitates the strands urging them to follow the path of least resistance which is to the left down the steps of the plate 95. In this manner an even strand by strand flow across the plate 95 is achieved.

Vibration of the flexure plate 95 is controlled by two mechanisms, tap hammer 96 and vibration damper 97. Tap hammer 96 is roughly hexagonal in cross section, with two of the opposite corners of the rough hexagon extending beyond the other corners. One of the extending corners is shown in contact with flexure plate 95 in FIGURE 1a. Tap hammer 96 is mounted on and rotates with cam shaft 83 so as to vibrate plate 95 when the extended corners contact the plate.

Vibration damper 97 is constructed roughly elliptical by the addition of oppositely placed plates to the center portion of shaft 98 which is journalled through bearings in dribble feed frame 57. Damper 97 bears against the lower, inside curvature of the rounded extension band of flexure plate 95 through a bearing plate 99. Rotation of damper 97 dampens vibrations in the flexure plate 95 caused by tap hammer 96 by limiting the up and down travel of plate 95 when damper 97 engages bearing plate 99, thereby promoting a smooth, controlled flow of strands across the flexure plate 95.

Amplitude of vibration can be varied by means of the vibration damper adjusting screw 100 spanning the extension band of flexure plate 95. Adjusting screw 100 is seated in the upper part of the rounded band of the plate 95 and threaded at its lower end through the lower part of the rounded section and the attached bearing plate 98. Turning screw 100 clockwise shortens the span between the upper and lower parts of the flexure band 95 thereby increasing the contact area between rotating damper 97 and bearing plate 99 which decreases the amplitude of vibration. Turning the screw counter-clockwise produces the opposite result.

Revolving push fingers 101 mounted on shaft 102 which is suitably journalled through bearings in the dribble feed frame 57 rotate counter-clockwise through slots in flexure plate 95 so as to push stagnant strands away from the rigid portion of the flexure plate near outer chamber plate 55.

It is desirable to retain some strands on flexure plate 95 to act as storage to compensate against irregular flow of feed from pick up blades 78. By allowing for some storage a strong irregular flow may be flattened to the smooth regular flow which is extremely important for accurate weighing. A constant flow rate will produce a constant amount of material in suspension and therefore give constant weights. Storage is obtained by producing vibrations just strong enough for material to travel at the same rate as the material is being metered to the dribble feed mechanism 14 by the oscillating retarding plate 54 and by allowing only a limited amount of strands to pass between swinging storage gate 103 and flexure plate 95.

Gate 103 is connected to and pivots on shaft 104 which is journalled through suitable bearings in the dribble feed frame 57. Gate 103 is swung up and down by adjusting a screw 105 which in turn is threaded through and oscillated by connecting rod 106 which rests on rocker arm 80. Gate 103 is returned to a position against screw 105 by the gravitational force of counterweight 107. The amount of storage held by gate 103 can be adjusted by turning screw 105 to vary the gap between the lower end of gate 103 and flexure plate 95.

Strands proceed downward and to the left on the flexure plate 95 until they deposit themselves strand by strand between the teeth of two parallel directional change sprockets 107A which are mounted on shaft 98. Sprockets 107A carry the strands around and deposit them individually on the moving dribble feed conveyor 108 which rides on driven pulley 109 and driver pulley 110 powered by drive shaft 111. The same structure is employed in this feed conveyor 108 as in the main feed conveyor 31. Strands are carried to and deposited on two feed sprockets 112 which are mounted on drive shaft 111. A chain and sprocket assembly preferably connects driver pulley 110 to driven pulley 109 so as to drive the both pulleys at the same speeds. Masks 113 and 114, both of which are mounted on dribble feed frame 57, retain strands on sprockets 107A and 112 respectively. Feed sprocket 112 carries the strands around and drops them into weigh bucket 67.

*Weigh bucket assembly*

The weigh bucket assembly 15 comprises a weigh bucket 67 suitably attached through a mounting post 115 to a conventional scale 116 employing a counterbalance 117 of the desired final weight, a balance lever 118 on fulcrum 120 between the counterbalance 117 and the mounting post 115. When the desired weight is held in weigh bucket 67 an electric eye circuit (simulated by microswitch 121) in scale 116 is broken which in turn stops the dribble feed mechanism 14 and dumps the weigh bucket 67 into a packaging conveyor bucket 122 by means of a series of electrical and mechanical linkages to be described later.

The weigh bucket 67 is shaped like a trough and comprises end plate 123, receiving plate 124, bucket door 125, and side plates 126. Referring to FIGURE 3 the pre-weight is first dumped into weight bucket 67 from volumetric bulk chamber 52. Following this strands are dribbled into weigh bucket 67 from feed sprocket 112 onto receiving plate 124.

The purpose of receiving plate 124 is to minimize the amount of material in suspension between the time a strand is discharged from a feed sprocket 112 and the time that strand registers its weight by impinging on receiving plate 124. The less material in suspension there is, the more accurate the machine is since this material in suspension cannot be retrieved but necessarily falls in the bucket regardless of the amount already in weigh bucket 67. Machines can be calibrated to compensate for material in suspension assuming a uniform dribble rate, but it is preferable to minimize this amount in suspension as much as possible.

Bucket door 125 is pivoted about shaft 127 which is movably mounted about the upper edge of side plates 126. Also fixed to shaft 127 is the bearing crank 128 adjacent one side of weigh bucket 67, the bearing surface of which is aligned with bucket dump trip 130. When the desired weight is in the weigh bucket 67 actuation of the air cylinder 131 pressured by air manifold 66 extends trip 130 which engages crank 128 and causes bucket door 125 to swing open and thereby dump the load along a path guided by the lower end of plate 123 into a packaging conveyor bucket 122.

An intermediate weigh bucket arrangement may be employed to increase the output of the machine. In this arrangement, directly below the weigh bucket described above would be a second similarly constructed bucket mounted on framework 10. The second bucket would not perform any weighing operation but would only receive and hold the weighed charge from the first bucket until an empty package conveyor bucket 122 was in position to receive the charge, at which time it would dump in the same way that the first bucket dumps. In this manner while the first bucket is weighing, the second bucket could be dumping thereby increasing the speed and total output of the machine.

*Packaging conveyor system*

Means are provided in the packaging conveyor system 16 to insure that weigh buckets 67 will not dump unless a moving packaging conveyor bucket 122 is correctly positioned to receive the strands without spillage, and means are provided to continue conveying the packaging bucket 122 after it is filled until it reaches a packaging station which station forms no part of this invention.

Referring to FIGURE 1a the packaging conveyor system 16 comprises an endless conveyor such as a chain type conveyor on which are mounted a series of articulated rectangular trough shaped buckets 122. Attached to framework 10 is bucket alignment trip 132 with a pivoted crank and roller assembly 133 that is forced to bear against the upper parts of buckets 122 by the compressed spring 134. The trip mechanism 132 is positioned laterally from the weigh bucket 67 a set distance such that when the crank and roller assembly 133 is lifted to its peak height by a passing conveyor bucket 122, electrical interlocks permit actuation of the weigh bucket dumping means, and this set distance is such that a conveyor bucket 122 will be in the proper position to receive the load from the dumping weigh bucket 67.

Referring to FIGURE 1b an additional interlock is provided in this machine to prevent dumping a second load into a single conveyor bucket 122 when two scales are operating in parallel. An electric eye beam assembly 135 is positioned between the two scales with the beam aimed across the path of the advancing packaging conveyor buckets 122. Unless the beam is unbroken, that is unless an empty packaging conveyor bucket 122 is in position, the weigh bucket of the second scale will not dump. The electrical circuit controlling this feature will be detailed hereinafter.

*Drive means*

The drive means for the feed hopper 11 and main feed conveyor 12 systems comprises a motor 136 (shown in schematic FIGURE 5 and in FIGURE 1a) which runs continuously while the machine is in operation. Motor 136 through a conventional sprocket and chain linkage drives sprocket 137 shown in FIGURE 2 which is keyed to gear 137.1 and armature plate 137.2, all of which are freely rotatable about drive shaft 32. Keyed to drive shaft 32 is the driven end of conventional magnetic clutch 138. When the electrical field of clutch 138 is energized, armature plate 137.2 is coupled to it which causes shaft 32 to rotate with sprocket 137, and when the field is de-energized, shaft 32 stops.

Similar gearing and clutching is employed in the adjoining parallel scale and may be conveniently driven by gear 137.1 meshing with a corresponding gear 139 in the adjoining scale.

When the volumetric bulk chamber 52 is empty, or when its level is low, mercury switch 60 closes an electrical circuit to the magnetic clutch 138 which then supplies rotational power to drive shaft 32 which in turn supplies oscillatory power to both slide plate 26 through linkages 140 and 140.1 and stir plate 24 through additional linkages 141 and 141.1. Movement of these elements causes the strands to feed from the feed hopper 11 to main feed conveyor 12. When the level in the chamber 52 rises too high, feed stop plate 58 is swung by incoming feed to turn mercury switch 60 so as to break the circuit to the magnetic clutch 138 and thereby halt the feed.

For purposes of describing the drive means for the dribble feed mechanism (14) reference is made to FIGURE 1b illustrating parts corresponding to those used in the left hand weighing station (FIGURE 1a).

The drive means for the dribble feed section 14 comprises motor 142 which drives sprocket 143 through a conventional magnetic clutch assembly 144 and sprocket and chain transmission. Tensioning sprocket 145 rotatably mounted on pivot arm 145.1 about pin 145.2 attached to frame work 10 is forced against the transmission chain by the compressed spring 145.3 to take out slack resulting from positioning the dribble feed assembly 14 for low volumetric pre-weights.

Sprocket 143 is keyed to and rotates cam shaft 83, which rotates cam 82 and vibrator 96.

Sprocket 143 through drive gear 146 and idler 147 drives gear 148 which is keyed to and rotates the dribble feed pulley shaft 110 which drive O rings 108 and dribble feed sprockets 112.

Sprocket 143 through drive gear 146 and idlers 147 and 150 drives gear 151 which rotates vibration damper drive shaft 98.

Sprocket 143 through drive gear 152 drives gear 153 which rotates push finger drive shaft 102.

Sprocket 143 through drive gear 154 drives gear 155 which rotates drive shaft 94.

Also mounted on cam shaft 83 on the end opposite the above described gear train is a conventional magnetic brake assembly 156.

The dribble feed drive motor 142, gear train, clutch 144 and brake 156 operate in the following manner to actuate the dribble feed mechanism 14. Motor 142 is continuously running while the machine is in operation. Clutch 144 is engaged to transmit power to the gear train to cause strands to flow across the dribble feed mechanism 14 into the weigh bucket 67. Clutch 144 is disengaged and brake 156 is engaged to positively lock the dribble feed mechanism 14 and prevent any further dribble after the desired weight has been deposited in the weigh bucket 67. Synchronization of these stops will be detailed in the electrical network discussion to follow.

*Electrical system*

There are two principal electrical systems in the machine herein described, one for the dribble feed and weigh bucket sections, and a separate system for the feed hopper and main feed conveyor sections.

Describing first the dribble feed and weigh bucket system and referring to FIGURE 4, depression of start button 159 energizes conventional motor starter 160 which supplies power to rotate motor 142.

Motor 142 turns sprocket 143 (see FIGURE 1b) which through the gear train, indicated in broken line and described earlier, actuates the moving elements of the dribble feed section 14. For purposes of illustration only the dribble feed O-ring conveyor 108 is shown in schematic, it being understood that all moving elements of dribble feed section 14 stop and start together with the dribble feed conveyor 108.

Between motor 142 and conveyor 108 is electromagnetic clutch 144 and electromagnetic brake 156, either one of which may be engaged only while the other is disengaged to start or stop conveyor 108 as desired.

Depressing start button 159 energizes starter 160 which causes current to flow to clutch 144 through closed switch 161A (relay 161 being energized in a manner hereinafter described), thereby coupling motor 142 to conveyor 108 causing strands to dribble feed into weigh bucket 67. Feed continues to dribble into bucket 67, until balance arm 118 tilts clockwise sufficiently far to open switch 162A, which, through switch 171, shifts relay 161, de-energizing clutch 144 and energizing brake 156. Tilting of balance arm 118 also closes switch 162B which permits current to flow to bucket alignment switch 132.

Since spacing and speed of packaging conveyor buckets 122 are uniform, alignment switch 132 can be placed at any point on the packaging conveyor so that the time pulse obtained is synchronized with the buckets 122 of the conveyor. An increase of speed of the conveyor requires adjusting the position of the alignment switch 132 to have weigh bucket 67 dump sooner; however, once switch 132 is properly adjusted it need not be touched again unless speed of the packaging conveyor is changed.

Bucket alignment switch 132 is open (as shown) when none of the buckets 122 is yet aligned to receive feed from weigh bucket 67. On the closing of switch 132 by a passing bucket 122, current flows to electric eye switch 135, which if receiving bucket 122 is empty, current passes through. Lead 165 powers the beam section of switch 135, and lead 164 powers the receiver end.

The short pulse of current caused by the momentary closing of alignment switch 132 flows from electric eye switch 135 through weigh bucket dump switch 166 to relay 167 which lifts lock pawl 168 and closes switch 169 thereby completing the circuit from starter 160 to timer motor 170. Timer motor 170 rotates the cams of clutch/brake holding switch 171, weigh bucket dump switch 166, lower bulk plate switch 172, upper bulk plate switch 173 and cam timer motor switch 169. All of these cams are mounted on the same cam shaft partially shown in broken line which is driven by timer motor 170, for a full revolution until lock pawl 168 drops back into its locking position on timer motor cam 169.

The short pulse of current also passes from electric eye switch 135, through weigh bucket dump switch 166 and to bucket dump delay switch 174 so as to convert the short pulse to a longer timed pulse controlled by weigh bucket dump cam 166. When the short pulse energizes the relay 174 a holding circuit drawing current from starter 160 is establishd through switch 166 which remains until the cam surface of switch 166 rotates to a point where the holding circuit is broken.

Weigh bucket dump cylinder 131 is normally in a retracted position keeping the weigh bucket 67 in a strand receiving disposition. Cylinder 131 extends when, and only for so long as, it receives current from switch 166. By reason of the holding circuit described above, this current flow commences with the first short pulse from electric eye switch 135 and continues for the predetermined period set by the cam of switch 166, a time sufficient to keep cylinder 131 extended long enough to fully dump weigh bucket 67.

When start button 159 is depressed upper bulk plate cylinder 62, which is normally extended, is retracted by current flow through switch 173. The lower bulk feed cylinder 64 which is also normally extended except when actuated by a current flow from switch 172 is extended. In this arrangement feed fills the bulk feed chamber 52. The initial load weighed is made up of dribble feed coming off of conveyor 108. When the proper weight of strands is held in bucket 67, a pulse of current flows through bucket alignment switch 132 and electric eye switch 135 to the cam train actuating circuit. This pulse passes through switch 166 which, with its holding circuit through relay 174, energizes cylinder 131 and dumps bucket 67.

The current also flows to relay 167 unlocking the cam train and energizing through switch 169 the cam timer motor 170 which rotates the cams one revolution until cam 169 is relocked by pawl 168.

After about 30° travel of the cam shaft, as illustratively depicted in the schematic, the cam 173 breaks the circuit to cylinder 62 causing upper bulk feed plate 61 to extend and define volumetrically the pre-weight.

After an additional 140° rotation, for illustrative purposes, switch 172 closes, permitting current to flow to cylinder 64 which retracts lower bulk feed plate 56 and thereby dumps the preweight into weigh bucket 67. Jiggling of weigh bucket 67 by the immediate impact of the failling preweight cannot prematurely trip the dump mechanism because the cam of switch 166 at this degree of rotation keeps the dumping circuit open.

The cams continue to rotate until locked by pawl 168 after a full revolution.

Feed dribbling into weigh bucket off conveyor 108 then adds the necessary final weight increment to tip the scale so as to open the switch 162A and close switch 162B. The circuit including 162B which energizes the dump cylinder 131 through switch 166 and relay 174 has been described above. This circuit dumps weigh bucket 67 and also starts the cam train rotating again by starting timer motor 170 and releasing lock pawl 168. This in turn repeats the cycle described above.

When scale 118 is thus tipped, switch 162A provides a positive shutoff to the dribble feed conveyor 108 by energizing brake 156 through switch 161B. At the same time opening of switch 162A deenergizes clutch 144. This stops all dribble flow almost instantaneously when the desired weight is held in bucket 67; this is very important for accurate final weights.

Clutch/brake holding switch 171 is provided to prevent the jiggling of scale 118 from making and breaking contact to clutch 144 and brake 156. When the final weight is held in weigh bucket 67, the bucket is dumped and cam train is started in the manner described earlier. The cam for switch 171, which rotates with the rest of the cams, is surfaced so as to prevent passage of current through switch 171 after the initial actuating pulse, thus preventing the making and breaking of contact to clutch 144 and brake 156.

The other principal electrical system in the machine is the main feed hopper circuit illustrated in schematic in FIGURE 5.

Depression of start button 180 energizes conventional 3-phase motor starter switch 181 which supplies power to motor 136.

Motor 136 through a sprocket chain transmission, gear train and pulley arrangement described earlier drives main feed conveyors 31A and 31B of adjoining weighing stations of a dual station machine by means of electromagnetic clutches 138A and 138B. (Reference will be made to the right hand station, identified by suffix A, and the left hand station by suffix B.) Feed is carried by conveyors 31A and 31B when clutches 142A and 142B are energized by current from mercury switches 60A and 60B until the level in the bulk feed measuring chambers rises to a point that incoming feed bunches up and pushes feed stop plates 58A and 58B to outwardly extended positions. Swinging of plates 58A and 58B to this position causes mercury switches 60A and 60B to break the circuit to clutches 138A and 138B respectively which in turn stops the main feed conveyors 31A and 31B until the level in the bulk chamber falls to a point where plates 58A and 58B resume their position to close mercury switches 60A and 60B.

It can be seen that each conveyor 31A and 31B operates independently. Motor 136 runs continuously while the machine is in operation, but clutches 138A and 138B are energized only when the feed level in their respective weigh stations is low.

*Alternative feed arrangement*

Figure 6:
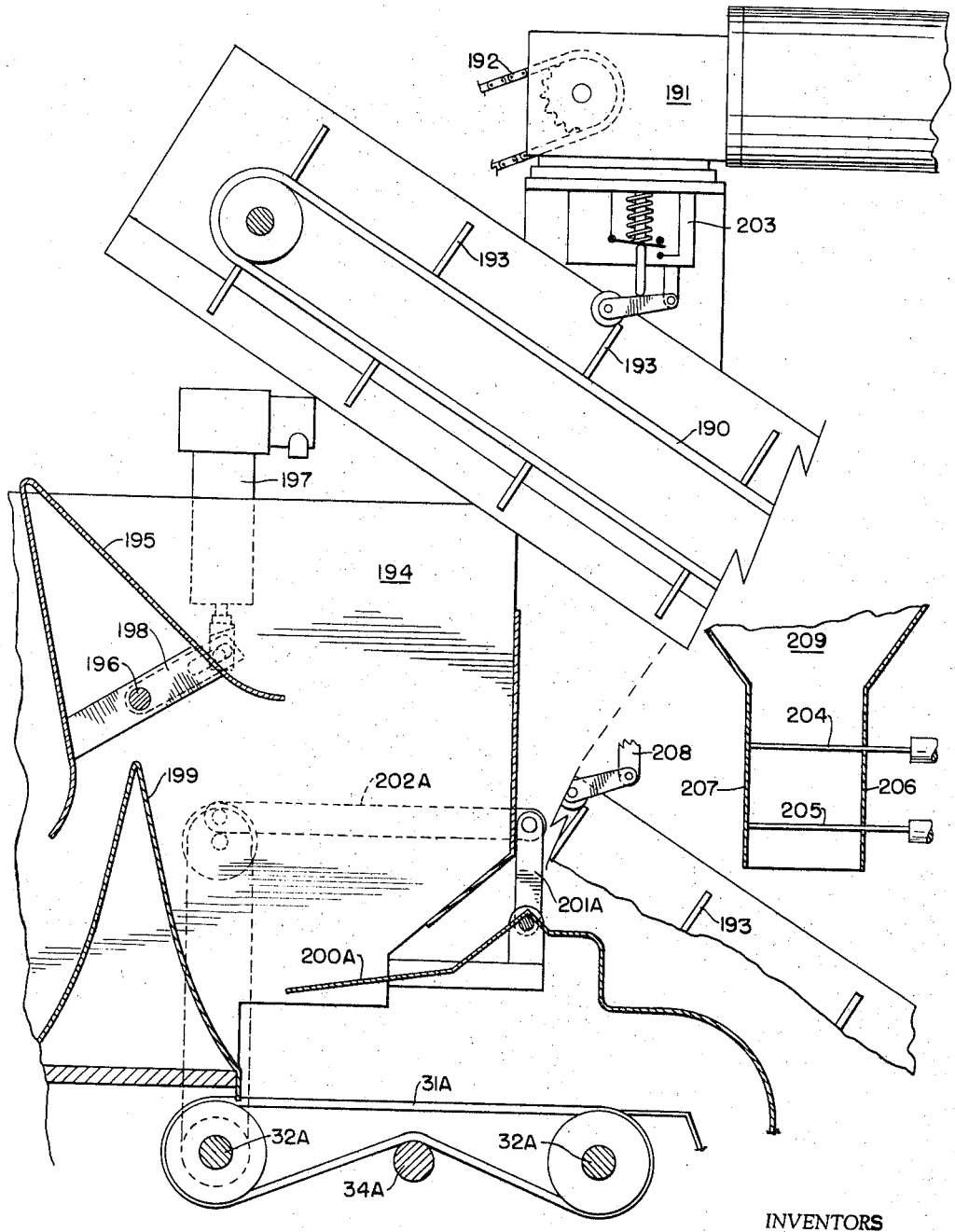
FIGURE 6 is a partial vertical section of an alternative feed hopper and conveyor arrangement for automatic feeding, taken substantially through the center.

FIGURE 6 depicts an alternative feed hopper and main feed conveyor arrangement for automatic feeding of two adjoining weigh stations from a single feed conveyor. Structurally the hopper and conveyor are very similar to their corresponding parts in the arrangement described earlier; the controls for them, however, are materially different.

Conventional bucket conveyor 190 driven by motor 191 through suitable sprocket chain transmission means 192 carries strands between bucket plates 193 to a level above feed hopper 194. The motor 191 and power shaft for conveyor 190 are suitably mounted about the main framework. Feed hopper 194 is substantially the same as hopper 11 described earlier and feeds both stations of a dual weigh station machine.

Distributor plate 195, which is attached to and tiltable about shaft 196, directs the strands falling from conveyor 190 to either the left or right hand weigh stations. (Elements of the right hand station will be identified by a number and suffix A; left hand station elements will be identified by the same number and suffix B.) Shaft 196 is mounted through suitable bearings housed in side plates of hopper 194 capable of being swung to alternate positions by frame mounted air cylinder 197 which moves crank 198 connected to shaft 196. Feed passes through the orifice formed between the end covers of hopper 194 and the framework mounted divider plate 199 on to main feed conveyor 31A (left hand conveyor which is not shown is essentially identical).

Before strand feed can fall from distributor plate 195 on to conveyor 30A, the feed must roll off the top of oscillating leveler plate 200A. Plate 200A is oscillated by crank 201A which is pinned to connecting rod 202A which in turn is pinned to and driven by pulley shaft 32A through suitable sprocket chain transmission means. Oscillation of plate 200A performs the same function with improved results as described earlier with reference to leveler plate 46, that is to level and align strands for smoother feed flow.

In the arrangement shown both the left hand and right hand conveyor sections are running while the machine is in operation. Strands are distributed by plate 195 to feed first the right hand weigh station until feed in that station rises high enough to open the right hand mercury switch in the manner described earlier. Opening of the right hand mercury switch disengages the conveyor clutch, also described earlier, stopping the feed conveyor 31A, and it also actuates air cylinder 197 which extends on being electrically energized and remains extended only so long as it is energized. Extension of cylinder 197 tilts distributor plate 195 to the position for feeding the left hand weigh station. Feed continues to flow to the left hand station until the level in the right hand station drops permitting its mercury switch to assume its normal closed position which in turn engages the right hand feed conveyor 31A and shifts the distributor plate 195 back to its right hand feeding position.

If the level in both of the weigh stations rises above the cutoff level, both mercury switches are open which disengages the clutches for both feed conveyors 31A and 31B. Control means are also provided to shut off conveyor 190 when this situation arises.

An additional control means is provided to time the shifting of plate 195 with the position of the individual buckets in conveyor 190. If plate 195 is shifted while strands are falling from a conveyor bucket, many of the strands will be scattered, spilled and broken. To prevent this, means are provided to keep plate 195 from shifting unless the position of the buckets is such that no strands are then being dumped into hopper 194. The feed bucket position switch 203 which is constructed and which operates as the earlier described bucket alignment switch 132 performs this function in the manner hereinafter described.

Bucket conveyor 190 may be fed by hand or automatically. One method of feeding found acceptable is to position the moving conveyor buckets under a feed tray having two horizontal fingers with upwardly curved ends, between which the bucket plates 193 pass. In passing, the bucket plates 193 engage and carry a bunch of strands off the end of the curved fingers and onto the conveyor 190. Strands are fed onto the feed tray in bulk and kept there by the upwardly curved ends of the feed tray fingers.

Another acceptable method of feeding bucket conveyor 190 is illustrated in FIGURE 6. In this arrangement a chamber similar to the bulk feed chamber 52 described earlier is employed to load each bucket of conveyor 190 with the proper amount of feed. Upper feed plate 204 and lower feed plate 205 are retractible through inner chamber plate 206 bottoming against outer chamber plate 207. The lateral distance between inner plate 206 and outer plate 207 may also be variable as described earlier. Power means may be an air cylinder arrangement as described earlier.

Upper plate 204 and lower plate 205 are actuated sequentially to fill and dump as described earlier on the closing of feed bucket alignment switch 208 by each passing bucket plate 193. Feed enters from hopper 209. Switch 208 is positioned relative to hopper 209 and the chamber such that lower plate 205 will not dump unless a feed bucket is properly aligned directly beneath the chamber to receive the feed with no spillage or breakage.

Among the advantages of this feeding arrangement are its even loading characteristics of conveyor 190, its adaptability to different feed rates to utilize the optimum weighing program for the scales being fed and its positive control of the strands feeding to conveyor 190 to prevent scattering and breakage.

Referring now to FIGURE 6, the electrical schematic for this alternative feed arrangement, it should be understood that the right hand weighing station will always receive feed first, and continue to, until its feed capacity is exceeded. When this occurs, the right hand feed conveyor is stopped and feed is diverted to the left hand station by the shifting of distributor plate 195. The feed will then continue to flow to the left hand station until the right hand feed level has dropped so as to close the right hand mercury switch which re-engages the right hand feed conveyor clutch and shifts the distributor plate 195 back to the right hand feed position. Conveyor 190 continues to bring in feed until mercury switches on both the right hand and left hand weigh stations are open by full bulk feed chambers.

Depression of start button 210 energizes conventional 3-phase motor switch 211 which supplies power to feed hopper conveyor motor 136, which drives conveyor 31A and 31B in the manner described earlier. In the stage shown in schematic, neither weigh station is full so that the mercury switches 60A and 60B are closed and both conveyor 31A and 31B are running.

Bucket conveyor 190 is driven by motor 191 which draws current through conventional starter 212. Starter 212 is energized either by current from starter 211 through relay 213 actuated by mercury switch 60B or by current from starter 211 through relay 214 actuated by mercury switch 60A in a manner to be described hereinafter. By means of this circuit, conveyor 190 continues to feed strands to the hopper 194 so long as either weigh station is not full.

Unless current flows to cylinder 197, distributor plate 195 remains in its normal right hand feeding position (as illustrated).

Feed continues to flow to the right hand station until mercury switch 60A is tilted to its open position by stop plate 58A. This disengages clutch 138A by breaking circuit between it and starter 211, which in turn stops feed flow in the right hand station. Opening of switch 60A also closes triple contact relay switches 214A and 214B and opens 214C (as shown). Current flows through contact 214B to the pole of relay 215, which relay, controls actuation of cylinder 197 which in turn positions distributor plate 195.

Distributor plate 195 will not shift to feed the left hand station until feed bucket position switch 203 is tripped by passing bucket plate 193, thereby preventing scattering of strands described earlier. Switch 203 is positioned relative to distributor plate 195 to establish a timed relation between passage of bucket plate 193 and shifting of plate 195 to prevent this scattering.

When bucket plate 193 engages position switch 203 contact 203A is closed and current flows from starter 211 through switch 203 and then through relay switch 214A and then to cylinder 197, thereby shifting plate 195 to its left hand feeding position. A holding circuit through relay 215 drawing current from relay switch 214B keeps plate 195 in this position for so long as the right hand station is full, that is, for so long as mercury switch 60A is open.

When feed level in the right hand station falls, mercury switch 60A is reclosed and relay 214 opens contacts 214A and 214B, and closes contact 214C. But current continues to flow through relay 215 from switch 203B until the next bucket plate 193 opens this circuit. When the next plate 193 opens switch 203B, the holding circuit on relay 215 is broken and plate 195 shifts, causing feed to flow to the right hand station until it fills and the cycle then repeats. Delaying the shifting of plate 195 until switch 203 is engaged prevents scattering of the strands when distributor plate 195 resumes its normal right hand feeding position.

Should the left hand station fill before the right hand station is ready to receive more feed, left hand mercury switch 60B will open, cutting off power to bucket conveyor 191 through starter relay 213. If the level in left hand station lowers first, bucket conveyor motor 191 will restart through the same circuit, that is, mercury switch 60B and relay 213. If the level in the right hand station lowers first motor 191 restarts on curent flowing from starter 211 through relay switch 214C.

Electrical controls for feeding strands to bucket conveyor 190 include a cam train switch system comprising cam timer motor switch 216, upper plate switch 217 and lower plate switch 218 all mounted on a shaft driven by timer motor 220. Timer switch 216 employs a pawl 221 locking arrangement which is actuated by relay 222. Relay 222 is energized by closure of feed bucket alignment switch 208.

Feed bucket alignment switch 208 draws current from conveyor starter 212. When passing bucket plate 193 closes switch 208 a pulse of current flows to relay 222 which unlocks pawl 221 and closes switch 216. Current from switch 216 energizes timer motor 220 which rotates the cam train for a full revolution until lock pawl 221 relocks the cam and breaks contact of switch 216.

The actuating means for upper feed plate 204 (FIG. 6) is cylinder 223 and for the lower feed plate 205 (FIG. 6) is cylinder 224, both of which retract only when they are electrically energized. The cams of switches 217 and 218 are surfaced such that lower feed plate switch 218 closes first and remains closed sufficiently long to energize cylinder 224, thereby retracting lower plate 205 and dumping the feed into a properly aligned bucket on conveyor 190. Switch 218 then reopens extending lower plate 205 back against outer chamber plate 207 (FIG. 6). Following this the cam of upper plate switch 217 closes switch 217 which energizes and retracts cylinder 223, thereby filling and volumetrically defining the next feed charge.

The next arriving bucket plate 193 then engages alignment switch 208 and the cycle is repeated.

Figure 8:
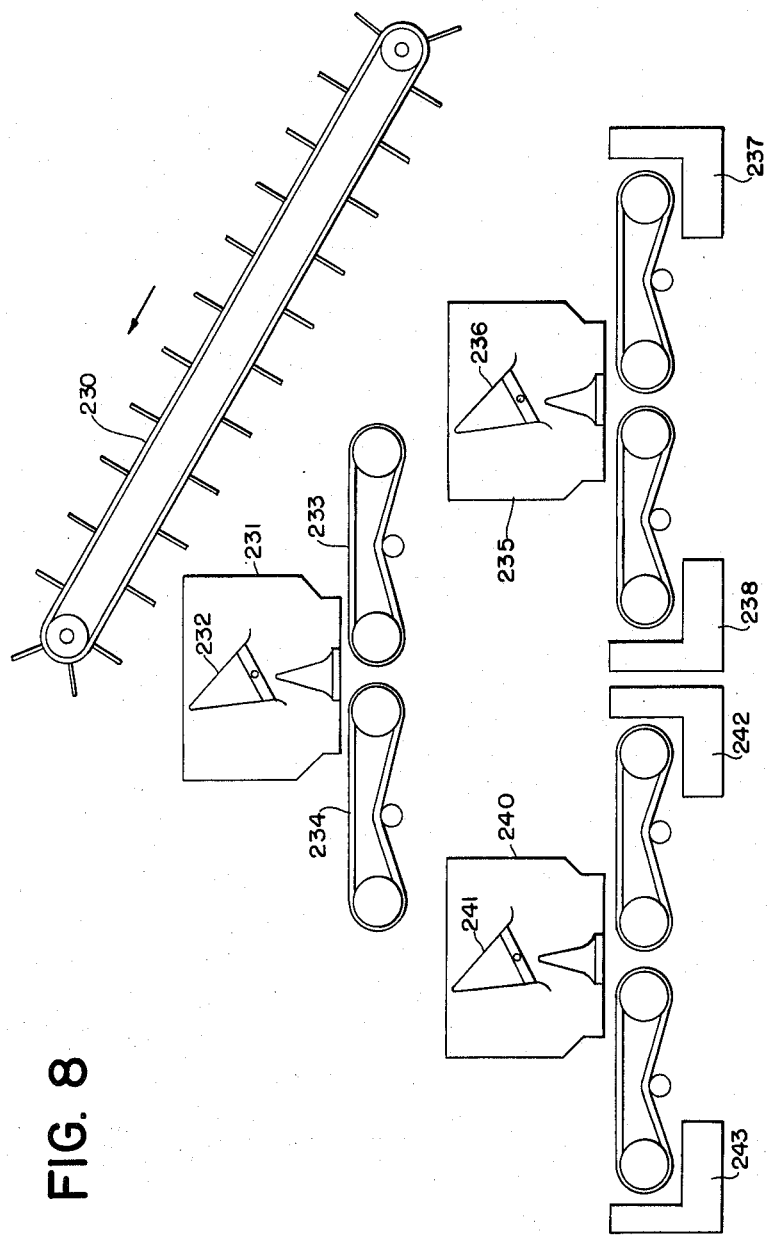
FIGURE 8 is a schematic view of a pyramid arrangement for multiple weigh stations.

This automatic feed arrangement can be readily adapted to feed any number of weighing machines. Referring to FIGURE 8 bucket conveyor 230 feeds primary hopper 231 in which is mounted primary distributor plate 232 of the type described earlier. Primary distributor plate 232 diverts feed preferably to right hand primary conveyor 233, but if the right hand conveyor 233 is not feeding, plate 232 diverts feed to left hand primary conveyor 234. If neither primary conveyor is feeding, bucket conveyor 230 is stopped.

Feed passes from the discharge end of right hand primary conveyor 233 into secondary hopper 235 in which is mounted secondary distributor plate 236. Secondary distributor plate 236 diverts feed preferably to its right hand weighing station 237 unless it is full, at which time plate 236 shifts and diverts feed to its left hand weighing station 238. The manner by which this is accomplished has been described earlier.

Feed also passes from the discharge end of left hand primary conveyor 234 into a similar hopper 240, distributor plate 241 and weight station 242 and 243 arrangement. It can thus be seen that by this arrangement any number of scales can be automatically fed from a single bucket conveyor dependent on the number of tiers in the pyramid of feed hoppers and conveyors. In the arrangement shown, the right side of the pyramid is always given priority to the feed, and when this side is full its distributor plate shifts the feed to the left side.

Shifting of distributor plates which feed from horizontal conveyors presents a problem since the bucket plates which bunch the strands and trip the actuating switch are absent. To prevent strand scatter in shifting, the horizontal conveyor must be halted while the distributor plate is being shifted. The means for accomplishing this will now be described.

Referring to FIGURE 9, closing of knife switch 250 energizes conveyor starter 251, through any one of relays 252, 253, 254 or 255 so as to supply power to conveyor motor 256. All of these relays are actuated by current from knife switch 250 through their respective mercury switches. Each mercury switch energizes its relay only when its weigh station requires feed. Thusly if any of the weigh stations 243, 242, 238 or 237 requires feed, at least one of the relays will be energized and starter 251 will close to power conveyor motor 256. If none of the weigh stations requires feed, no current will flow to starter 251 and motor 256 will stop, halting feed on the bucket conveyor 230.

Feed is carried by conveyor 230 and dropped into primary hopper 231 which by the primary distributor plate 232 diverts the feed to the right hand primary conveyor 233. Feed is carried on conveyor 233 to secondary hopper 235 where distribtuor 236 diverts the feed to the right hand weigh station 237 unless it is full, which condition would open mercury switch 237A.

If weigh station 237 is full the opening of mercury switch 237A disengages clutch 237B halting the feed to the scale and shifts relay 255 to close contact 255C. Current flows through contact 255C to air cylinder 257 causing its breaker bar 258 to move to the left. Breaker bar 258 extends only when cylinder 257 is electrically energized. Leftward movement of breaker bar 258 permits spring tensioned switches 260 and 261 to shift, opening contacts 260B and 261B and closing contacts 260A and 261A.

Opening of contact 260B de-energizes clutch 233A which stops conveyor 233 thereby halting the feed to hopper 235.

Breaker bar 258 continues its leftward movement until it shifts spring tensioned switches 262 and 263, opening contacts 262B and 263B and closing contacts 262A and 263A.

Current then flows through contacts 260A and 262A to energize clutch 233A and restart conveyor 233 and thereby resume feed to hopper 235. At the same instant current flows through contacts 261A and 263A to relay 264 which causes distributor plate 236 to shift to its leftward feeding position. Plate 236 completes its shift before strands falling from conveyor 233 reach it, thereby preventing strand scattering.

Feed will then flow to the left weigh station 238 until the feed level in the right station 237 falls to the point where more feed is required. When this happens mercury switch 237A swings back to its closed position, energizing relay 255 which opens contact 255C. This deenergizes cylinder 257, causing breaker bar 258 to retract which shifts the contacts of switches 260, 261, 262 and 263 back to positions shown in the schematic. Contact 262A breaks, first deenergizing clutch 233A to halt feed to hopper 235. Then contact 262B makes, followed by the making of contact 260B, starting the feed again. At the same time contacts 261A breaks, de-energizing relay 264 and thereby shifting plate 236 to its rightward feeding position. Breaking of contact 263A by itself does not shift plate 236, since current still flows to relay 264 through contact 261A.

The time required for the transit of breaker bar 258 is sufficient for all strands falling from the stopped feed conveyor 233 to clear the distributor plate 236 before the shift of the plate 236 commences, thereby preventing scattering of the strands. This time of transit can be varied by changing the speed of cylinder 257.

Figure 7:
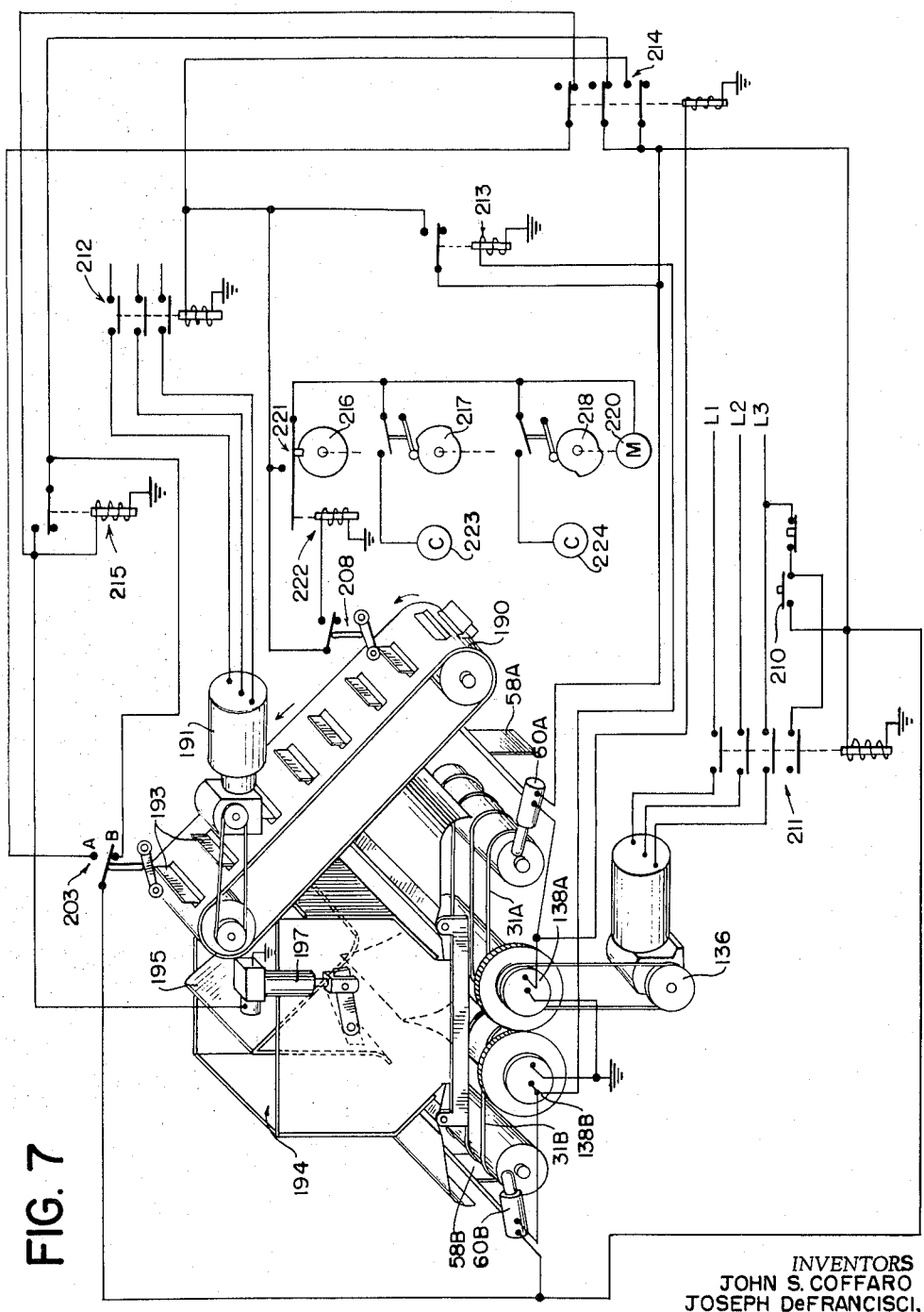
FIGURE 7 is a schematic diagram of certain electrical control circuits of the alternative feed hopper and conveyor arrangement illustrated in FIGURE 6.

If both weigh stations 237 and 238 are full both relays 254 and 255 are de-energized, closing contacts 254B and 255B. This energizes relay 265 which shifts primary distributor plate 232 in synchronization with the position of bucket conveyor 230 in the manner described earlier with reference to FIGURE 7. Shifting of plate 232 diverts feed from the right hand primary conveyor 233 to the left hand conveyor 234. When either of weigh stations 237 or 238 is ready for more feed, its mercury switch and relay shift, which shifts primary distributor plate 232 back to its right hand feeding position in the same manner as described earlier.

When primary distributor plate 232 is in its leftward feeding position, feed travels off conveyor 234 into hopper 240 and to weigh station 242 or 243, dependent on the position of secondary distributor plate 241. Right hand station 242 has priority, and when it fills, relay 253 is de-energized which permits current to flow to cylinder 266. Cylinder 266 extends breaker bar 267 and switches contacts to stop conveyor 234 and then simultaneously shift distributor plate 241 and restart conveyor 234. When station 242 calls for more feed the action is reversed as described earlier.

When all of the weigh stations are full, relays 252, 253, 254 and 255 are de-energized and no current flows to conveyor motor 256 until one of the stations requires more feed.

While this description has dealt with weighing of stranded products such as macaroni, it is apparent that the described machine and feed means are readily adaptable for use in any number of various types of products other than stranaded products.

It is also to be understood that certain modifications and improvements which would be apparent to those skilled in the art can be made to the machine herein described. Therefore, while we have described various preferred embodiments of the invention, it will be understood that we shall not be limited by the foregoing description but solely by the claims granted to use.

What is claimed is:

1. The method of automatically loading product into receivers which comprises the steps of:
    (a) moving a plurality of receivers along a predetermined path,
    (b) repetitively segregating batches of said product into two loading stations having discharges aligned with said path, said discharges being hereinafter sequentially referred to so as to correspond with the direction of movement of said receivers,
    (c) unloading product from the first discharge as soon as a receiver is aligned therewith, and
    (d) unloading product from said second discharge as soon as a receiver unfilled by said first discharge is aligned with said second discharge.

2. The method of automatically loading product into receivers which comprises the steps of:
    (a) moving a plurality of receivers along a predetermined path and at predetermined spacing,
    (b) repetitively segregating batches of said product into two loading stations having discharges aligned with said path and at equal spacing to said receivers,
    (c) unloading product from the first discharge as soon as a receiver is aligned therewith, and
    (d) unloading product from said second discharge as soon as a receiver unfilled by said first discharge is aligned with said second discharge.

3. The method of automatically loading product into receivers which comprises the steps of:
    (a) moving a plurality of receivers along a predetermined path,
    (b) repetitively segregating batches of said product into two loading stations having discharges aligned with said path, said discharges being hereinafter sequentially referred to so as to correspond with the direction of movement of said receivers,
    (c) unloading product from the first discharge as soon as a receiver is aligned therewith,
    (d) sensing the loaded condition of the receiver loaded by said first discharge before such receiver is aligned with said second discharge, and
    (e) unloading product from said second discharge as soon as a receiver is aligned therewith, such unloading being prevented in response to said sensing step when such receiver is already loaded by said first discharge.

4. The method of automatically loading product into receivers which comprises the steps of:
    (a) moving a plurality of receivers along a predetermined path,
    (b) repetitively segregating batches of said product into two loading stations having dscharges aligned with said path, said discharges being hereinafter sequentially referred to so as to correspond with the direction of movement of said receivers,
    (c) unloading product from the first discharge as soon as a receiver is aligned therewith,
    (d) sensing the loaded condition of the receiver loaded by said first discharge before such receiver is aligned with said second discharge, (e) unloading product from said second discharge as soon as a receiver is aligned therewith, and (f) coupling said sensing step with said second discharge unloading step to prevent such unloading when said receiver is already loaded by said first discharge.

5. The method of automatically loading product into receivers which comprises the steps of:

(a) moving a plurality of receivers along a predetermined path, (b) repetitively segregating batches of said product into two loading stations having discharges aligned with said path, said discharges being hereinafter sequentially referred to so as to correspond with the direction of movement of said receivers, (c) unloading product from the first discharge as soon as a receiver is aligned therewith, (d) sensing the loaded condition of the receiver loaded by said first discharge before such receiver is aligned with said second discharge, (e) generating a signal in response to said sensing step related to the filled condition of said receiver, and (f) unloading product from said second discharge as soon as a receiver is aligned therewith, such unloading being prevented in response to said signal when such receiver is already loaded by said first discharge.

6. The method of automatically loading product into receivers which comprises the steps of:

(a) moving a plurality of receivers along a predetermined path, (b) repetitively segregating batches of said product into two loading stations having discharges aligned with said path, said discharges being hereinafter sequentially referred to so as to correspond with the direction of movement of said receivers, (c) unloading product from the first discharge as soon as a receiver is aligned therewith, (d) sensing the loaded condition of the receiver loaded by said first discharge before such receiver is aligned with said second discharge, (e) generating a signal in response to said sensing step related to the filled condition of said receiver, (f) unloading product from said second discharge as soon as a receiver is aligned therewith, and (g) coupling said signal with said second discharge unloading step to prevent such unloading when said receiver is already loaded by said first discharge.

7. The method of automatically loading product as claimed in claim 4 wherein said sensing step comprises directing an energy beam across the path of said receivers on an axis interrupted by product in a receiver loaded by said first discharge prior to the alignment of such receiver with said second discharge.

8. The method of automatically loading product as claimed in claim 7 wherein said energy beam is a light beam.

9. The method as claimed in claim 6 wherein said sensing step comprises directing a light beam across the paths of said receivers on an axis interrupted by product in a receiver loaded by said first discharge prior to the alignment of such receiver with said second discharge, and said signal generating step comprises deriving a photoelectric signal from said light beam each time such beam is interrupted by such product.

10. The method of automatically loading product into receivers which comprises the steps of:

(a) moving a plurality of receivers along a predetermined path and at predetermined spacing, (b) repetitively segregating batches of said product into two loading stations having discharges aligned with said path and at equal spacing to said receivers, (c) sensing when two of said receivers are aligned for receipt of product from said first and second discharges, (d) unloading said product from said first discharge into one of said receivers in response to said sensing step when such receiver is aligned therewith, (e) sensing the loaded condition of the receiver loaded by said first discharge before such receiver is aligned with said second discharge, and (f) unloading product from said second discharge in response to said first sensing step as soon as said sensing relates said alignment, said unloading being prevented in response to said second sensing step when the receiver aligned with said second discharge is already loaded by said first discharge.

11. The method of automatically loading product as claimed in claim 10 wherein said second sensing step comprises directing a light beam across the paths of said receivers on an axis interrupted by product in a receiver loaded by said first discharge prior to the alignment of such receiver with said second discharge, and said signal generating step comprises deriving a photoelectric signal from said light beam each time such beam is interrupted by such product.

12. The method of automatically unloading segregated batches of product from spaced first and second discharges into a plurality of equally spaced receivers moving in a path in line with and beneath said discharges, said second discharge being spaced from said first discharge in the direction of movement of said receivers, comprising the steps of:

(a) generating a signal each time said receivers are aligned to receive batches of product unloaded from said discharges, (b) unloading said first discharge into one of said receivers in response to one of said signals when said signal indicates said receivers are so aligned, (c) sensing that product has been unloaded from said first discharge into a receiver before such receiver passes the position for receiving product from said second discharge, and (d) unloading said second discharge when said signal indicates said receivers are so positioned provided said sensing step relates the unfilled condition of the receiver so positioned with respect to said second bucket.

13. The method of automatically unloading segregated batches of product from spaced first and second discharges into a plurality of equally spaced receivers moving in a path in line with and beneath said discharges, said second discharge being spaced from said first discharge in the direction of movement of said receivers, comprising the steps of:

(a) generating a first signal each time said receivers are aligned to receive batches of products from said discharges, (b) unloading said first discharge into one of said receivers in response to one of said first signals when such signal indicates said receivers are so aligned, (c) directing a light beam across the path of said product in each said loaded receiver when such receiver passes into unloading position with respect to said second discharge, (d) photoelectrically generating a second signal when said beam is uninterrupted by the interposition of product in each said loaded receiver, and (e) unloading said second discharge in response to the simultaneous generation of said first and second signals into another of said receivers not already loaded by said first bucket.

14. The method of automatically unloading segregated batches of product from spaced first and second discharger into a plurality of equally spaced receivers moving in a path in line with and beneath said discharger, said second discharge being spaced from said first discharge in the direction of movement of said receivers, comprising the steps of:

(a) unloading said first discharge into one of said receivers when said receiver is aligned therewith,
(b) sensing that product has been unloaded from said first discharge into a receiver before such receiver passes the position for receiving product from said second discharge, and
(c) unloading said second discharge into one of said receivers when said receiver is aligned therewith and in response to said sensing step when such step relates the unfilled condition of such receiver.

15. The method of automatically unloading product from first and second spaced discharges into a plurality of equally spaced receivers moving in a path in line with said discharges comprising the steps of generating a first signal when said receivers are aligned to receive said product from said discharger, generating a second signal by the interruption of a beam directed both across said receiver path and intermediate said first and second discharges caused by the passage of a filled receiver at the position aligned for receiving product from said second discharge, unloading said first weigh bucket in response to said first signal, and unloading said second weigh bucket in response both to the presence of said first signal and absence of said second signal.

16. The method of unloading a predetermined amount of product into a plurality of spaced receivers moving in a path beneath and in line with a corresponding plurality of equally spaced discharges comprising the steps of preferentially feeding said product to the lead most empty discharge, generating a first signal when said receivers are aligned to receive said products from said discharges, generating a plurality of second signals by the interruptions of beams directed both across said receiver path and intermediate the first of said plurality of discharges and each adjacent following discharge caused by the passage of a filled receiver at the position aligned for receiving product from the adjacent following discharge, and unloading each of said discharges in response both to the presence of said first signal and absence of said second signal from each adjacent preceding beam.

References Cited by the Examiner

UNITED STATES PATENTS

| | | | |
|---|---|---|---|
| 1,128,796 | 2/1915 | Liggett | 222—196 |
| 1,425,251 | 8/1922 | Gwinn | 198—39 |
| 1,545,376 | 7/1925 | Weatherby | 222—196 |
| 2,720,375 | 10/1955 | Carter | 177—1 |
| 2,732,163 | 1/1956 | Senzani | 198—39 X |
| 2,742,185 | 4/1956 | Landry | 222—1 |
| 2,770,351 | 11/1956 | Curioni | 198—39 |
| 2,922,611 | 1/1960 | Aust | 177—1 |
| 2,976,006 | 3/1961 | Stambera | 198—39 X |
| 2,980,290 | 4/1961 | Fahrni | 222—1 |

SAMUEL F. COLEMAN, *Primary Examiner.*

LEYLAND M. MARTIN, *Examiner.*